UNITED STATES PATENT OFFICE.

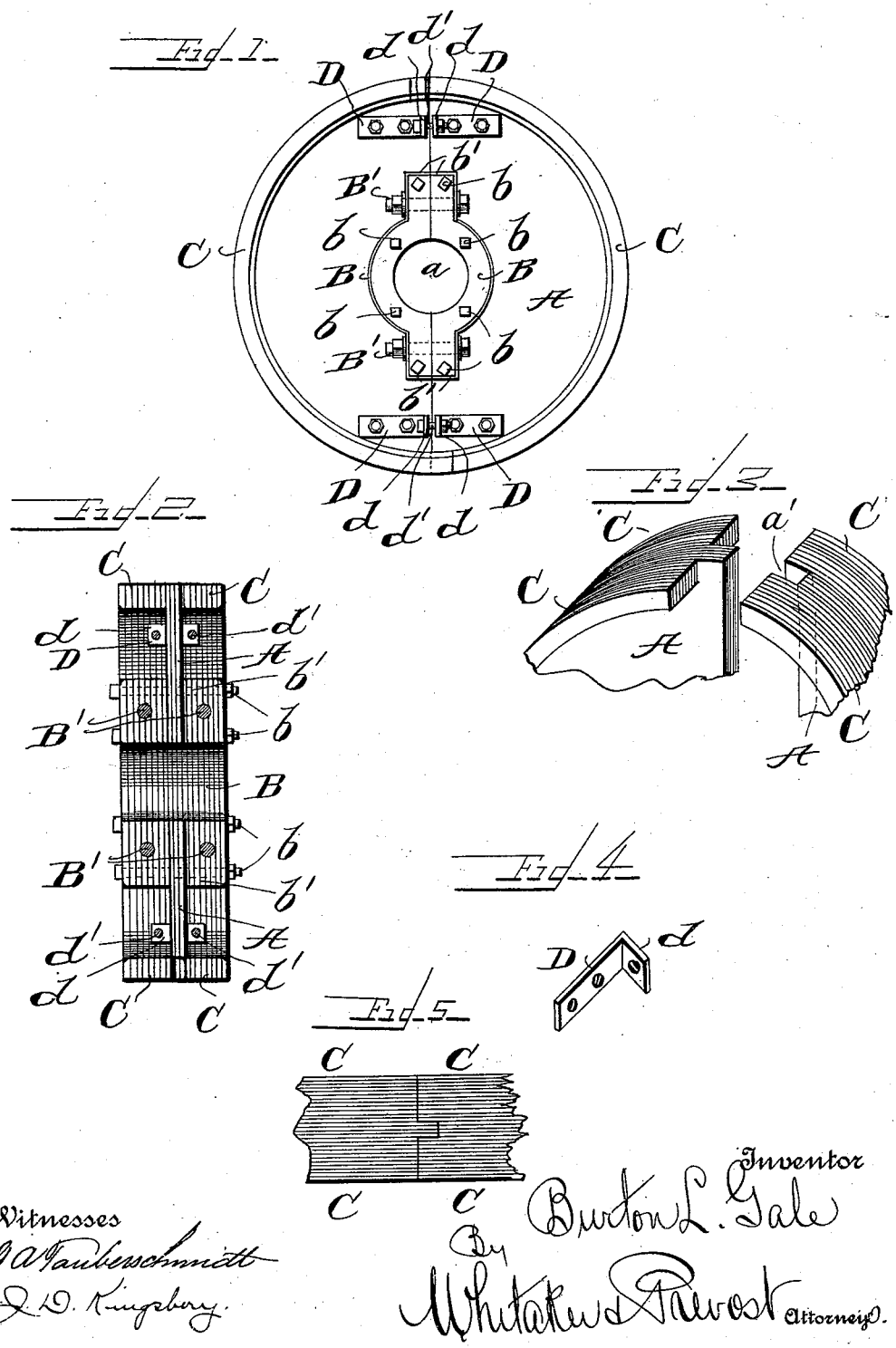

BURTON L. GALE, OF WARREN, PENNSYLVANIA.

PULLEY.

SPECIFICATION forming part of Letters Patent No. 534,435, dated February 19, 1895.

Application filed May 22, 1894. Serial No. 512,066. (No model.)

*To all whom it may concern:*

Be it known that I, BURTON L. GALE, a citizen of the United States, residing at Warren, in the county of Warren and State of Pennsylvania, have invented certain new and useful Improvements in Pulleys; and I do hereby declare the following to be a full, clear, and exact description of the invention, such as will enable others skilled in the art to which it appertains to make and use the same.

My invention is an improvement in split pulleys and consists in the novel features hereinafter described, reference being had to the accompanying drawings which illustrate one form in which I have contemplated embodying my invention and said invention is fully disclosed in the following description and claims.

Referring to the said drawings, Figure 1 is a side elevation of a pulley constructed according to and embodying my invention. Fig. 2 is an elevation of one half of the same. Fig. 3 is a perspective view of adjacent portions of the two parts of the pulley, showing the parts separated. Fig. 4 is a detail view of one of the brackets employed in holding the parts of the pulley together. Fig. 5 is a plan view of a portion of the periphery of the pulley adjacent to the line of separation of the parts thereof.

My improved pulley is composed of wood veneer glued together and having the grain of each layer disposed at an angle to the grain of the adjacent layer on either side.

A represents the web of the pulley which is composed of any desired number of thicknesses of veneer, each extending from the central aperture $a$ for the reception of the shaft, to the outer periphery of the pulley. Upon each side of the central portion of the web A the hub portions B B of veneer are built up, as clearly shown in Fig. 2, and upon the outer portions of web A the rim portions C C of the pulley are built up in the same manner. By making the pulley with a veneer hub as shown I dispense with the necessity of a metal hub and a bushing and render the construction lighter and cheaper.

While a hub constructed of wood veneer in the manner described will be strong enough to answer all practical purposes, I prefer in order to secure the greatest possible amount of strength to provide it with a series of reinforcing bolts $b\ b$ as shown in Figs. 1 and 2 which bind the layers of veneer together.

The hub B B is made circular for the most part but is provided at opposite sides with radially extending portions $b'\ b'$ which when the pulley is divided into two parts, form bosses at either side of the shaft to receive connecting bolts B' B', see Figs. 1 and 2, for uniting the two parts of the pulley and clamping them upon the shaft. In addition to the connecting bolts B' B', I prefer to connect the two parts of the web A at points adjacent to the periphery of the pulley and to this end I provide the meeting edges of the web at two or more points near the periphery with brackets one of which is shown in detail in Fig. 4. These brackets consist each of a plate D provided with bolt or screw holes by which it may be secured to the web, and a perforated lug or ear $d$. Connecting bolts $d'$ are made to engage the apertures in the opposing ears $d\ d$ and are provided with nuts so that the parts of the pulley may be drawn very tightly together at these points as shown in Fig. 1.

In order to prevent any lateral movement of the two parts of the pulley at their peripheries I prefer to provide the meeting edges of the web at each end of the line of separation between the parts of the pulley, with the construction shown in Figs. 1 and 3. The lines of separation of the rim portions are on opposite sides of the pulley and on opposite sides of the line of separation of the web. Thus at each end of the line of separation of the web, the rim portions of one part of the pulley will project beyond the web portion as shown in Fig. 3, while the web of the opposite portion of the pulley will project beyond the rim portions so as to enter the recess $a'$ formed between the projecting rim portions of the opposing part. Hence in looking at the periphery of the pulley as shown in Fig. 5 the line of separation will not be a straight line owing to the line of separation of the rim portions being at one side of the line of separation of the web as will be readily seen.

It will be seen that my improved pulley is very light, strong and durable and may be readily placed upon a shaft and clamped firmly thereon when desired without the use of a metallic bushing.

What I claim, and desire to secure by Letters Patent, is—

1. A pulley having a centrally projecting hub, the rim, web, and hub being each formed in two sections, the rim, web, and hub of each section being made of continuous layers of wood veneer cemented together throughout the full extent of the layers, the web veneers extending inwardly to the bore of the hub and means for connecting the two portions of the pulley together, substantially as described.

2. A pulley formed in two parts, each part having a section of a hub provided with radial extensions, each section composed of layers of wood veneer with the full extent of each layer cemented to its adjacent layer or layers, and means for uniting the radial portions of both sections, substantially as described.

3. A pulley having a central projecting hub, the rim, web and hub, being formed in two parts, the rim, web and hub, being made of continuous layers of wood veneer cemented to each other throughout the full extent of the layers; the web veneers extending inwardly to the bore of the hub, said hub having radial projections; and securing means connecting the radial portions of the sections of the hub, substantially as described.

4. A pulley formed in two parts having a hub, each part having a section of a hub provided with radial extensions, each section composed of layers of wood veneer with the full extent of each layer cemented to its adjacent layer or layers, reinforcing bolts passing through the layers of said hub, and securing bolts uniting the radial portions of the two sections, substantially as described.

5. A pulley formed in two parts each part having its rim, web and hub made of continuous layers of wood veneer cemented to each other throughout the full extent of the layers, each section of the hub being provided with radial extensions, bolts for securing the two parts of the pulley together passing through the radial extensions of the hub and connecting devices secured to the web between the rim and the hub, substantially as described.

In testimony whereof I affix my signature in presence of two witnesses.

BURTON L. GALE.

Witnesses:
PERRY D. CLARK,
T. G. PHILLIP.